Feb. 4, 1958   H. P. LHOTA   2,822,232
SLIDE SUSPENSION FOR DRAWERS
Filed March 5, 1954   2 Sheets-Sheet 1
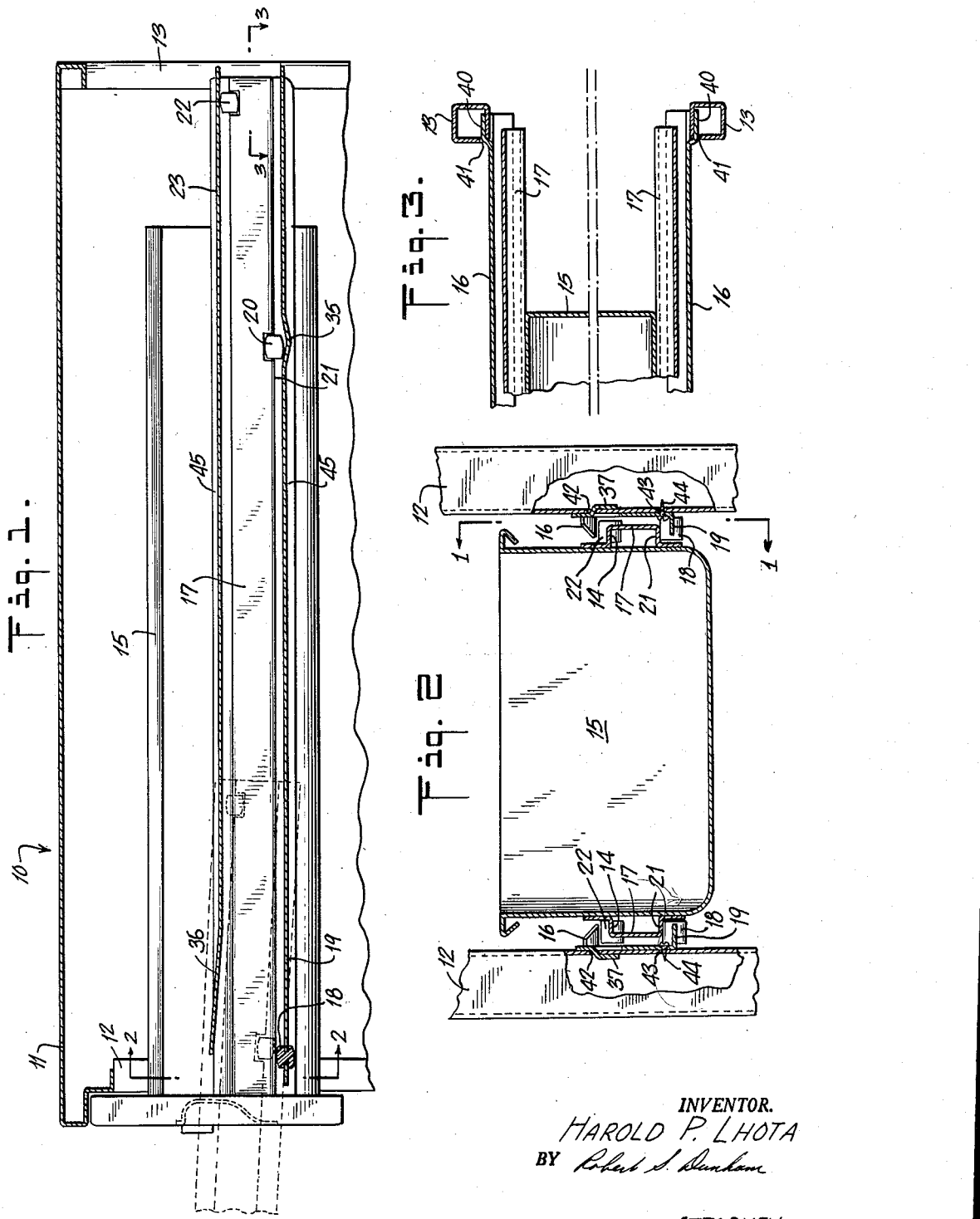
INVENTOR.
HAROLD P. LHOTA
BY Robert S. Dunham
ATTORNEY Feb. 4, 1958           H. P. LHOTA           2,822,232
SLIDE SUSPENSION FOR DRAWERS
Filed March 5, 1954           2 Sheets-Sheet 2
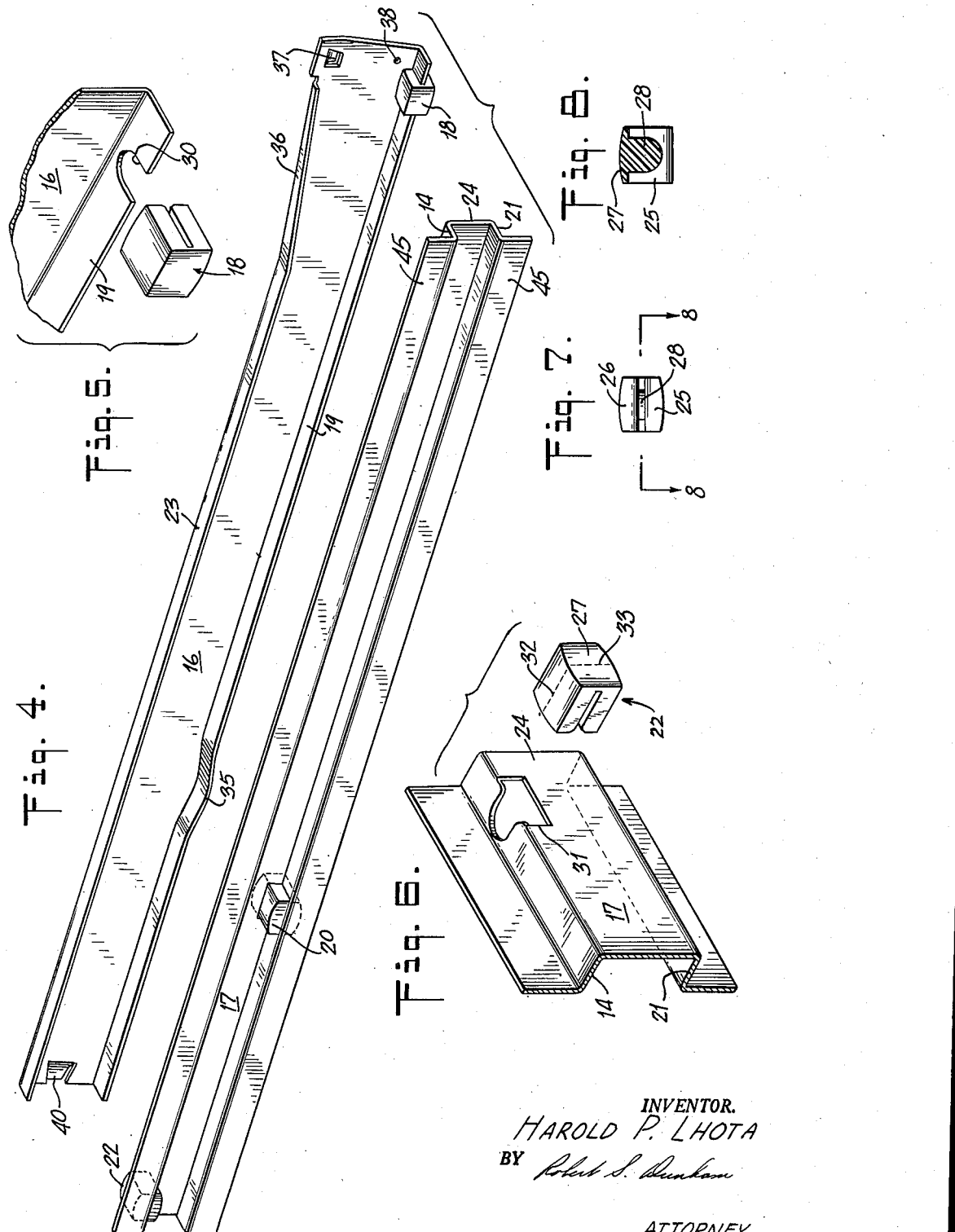
INVENTOR.
HAROLD P. LHOTA
BY
ATTORNEY

United States Patent Office 2,822,232
Patented Feb. 4, 1958

2,822,232
SLIDE SUSPENSION FOR DRAWERS

Harold P. Lhota, Canton, Ohio, assignor to Republic Steel Corporation, Cleveland, Ohio, a corporation of New Jersey Application March 5, 1954, Serial No. 414,315

3 Claims. (Cl. 312—341)

This invention relates to slide suspension means for drawers and more particularly to friction reducing elements for interposition between the lateral slides of drawers and the guides for said slides provided in drawer recesses.

In metal cabinets and cabinets of other types which include drawers which have metal lateral slides mounted in guides fixed on the sides of drawer recesses, various types of bearing means have been used to reduce the friction and avoid metal on metal contact between the slides of the drawers and the guides for such slides. Ball bearings and roller bearings have been used, and more recently bearing elements of compositions, including nylon or other materials having low frictional characteristics, have been substituted. The bearing elements of nylon or other material of low frictional characteristics have been fixed with respect to one of the members, i. e., the slides and guides, and contacted the other member in sliding relationship. It has been a problem in the use of such bearing elements to provide suitably positioned bearing elements which can be easily assembled with the other components and which do not require extra means to maintain them in assembled position.

An important object of this invention is to provide a load-supporting bearing element between the slide and guide components of the drawer suspension which may be assembled readily with the guide and slide members and which may be retained in position without providing additional or auxiliary connecting means.

Another object of the invention is to provide bearing elements which have low frictional characteristics and which function as load-bearing elements and also act to give lateral bearing between the interacting metal surfaces of the slide and guide components of a drawer suspension.

A still further object is to provide bearing elements which are reversible so that new bearing surfaces may be used in the event that the surfaces first used become worn. In addition, it is an object of the invention to provide elements at least some of which are interchangeable and which may be assembled readily in one or more of the localities at which the elements are to be positioned.

Other objects of the invention will appear from a description of the invention.

The invention comprises a load-supporting bearing element for maintaining the interacting metal surfaces which are the components of a drawer slide and guide therefor out of frictional engagement. The bearing element comprises a glide block made of a material having low frictional characteristics formed into two lateral portions connected by a transverse portion at one end of said lateral portions. The lateral portions of the glide block are spaced apart sufficiently to permit them to straddle one of the horizontal portions of the drawer and guide components in such a manner that one of the lateral portions is interposed between the metal component which the bearing element straddles and the adjacent horizontal portion of the other component. The transverse portion joining the lateral portions is adapted to be interposed between the guide and slide component to which it is connected and the adjacent vertical wall of the other component. The transverse portion acts as a bearing element in the event that side thrust is imposed on the drawer. The invention also contemplates the provision of a centrally located pillar or key between the lateral portions of the glide block, with corresponding recesses provided on the slide and guide components at the desired positions to maintain the glide blocks in the desired locations.

The invention also contemplates the formation of the guide members in such manner that the component parts may be readily separated for the purpose of removal of the drawer without weakening the guide members and without displacing or requiring the removal of the glide blocks. The guide members are also provided with means for maintaining the drawer in the closed position.

For a more complete description of the invention, reference is made to the drawings wherein:

Fig. 1 is a side sectional view of a metal cabinet having a drawer and showing the arrangement of slide and guide components, with glide block elements, embodying the invention, arranged for the suspension of the drawer;

Fig. 2 is a transverse sectional view taken through the drawer along the line 2—2 in Fig. 1;

Fig. 3 is a sectional plan view taken along the line 3—3 in Fig. 1;

Fig. 4 is an exploded perspective view of the slide and guide components, showing the arrangement of the glide block members;

Fig. 5 is a perspective view of the glide block and the recess provided in the guide member at the location in which said glide block is positioned;

Fig. 6 is a perspective detailed view of the recess provided in the slide member to receive the glide block attached thereto;

Fig. 7 is an end view of a glide block; and

Fig. 8 is a sectional view of the glide block taken along the line 8—8 in Fig. 7.

In Figs. 1 to 3, there is illustrated a portion of a metal cabinet 10 having a top 11, front upright columns or elements 12, and rear upright columns or elements 13, a drawer 15 suspended between the front columns 12 and the rear columns 13, and guide members 16 which receive the lateral drawer slides 17. The guides 16 and the slides 17 are maintained out of contact with each other by a front glide black 18, fixed to the lower horizontal flange 19 of the guide 16, and by the glide block 20 which is fixed to the lower horizontal shoulder 21 of the drawer slide 17. It will be understood that when reference is made to the guide and slide members, that the drawer and the recess are provided with a pair of similar elements on each side of the drawer, as shown in Figs. 2 and 3, and that it is the interaction of the slides and guides on both sides which provide the suspension for the drawer. However, for purposes of description, reference will be confined to the description of the elements on one side of the drawer.

A third glide block 22 is fixed to the upper horizontal shoulder 14 of the drawer slide 17 and maintains the upper shoulder 14 out of contact with the upper flange 23 of the guide 16.

Referring to Figs. 7 and 8, the glide blocks which are used as the bearing elements comprise two lateral portions 25 and 26 which are spaced apart the thickness of the metal of the slide and guide members. The lateral portions 25 and 26 are connected by a transverse portion 27 at one end of said lateral portions. A central pillar or key portion 28 may also be provided to give added strength to the glide block element. Such key also serves in the positioning of the glide blocks at a definite location on the slide or guide and in the maintaining of such position during use. Referring to Fig. 5, in the lower flange 19 of the guide element 16 at the location where the front glide block 18 is to be positioned, a recess 30 is formed in the flange. The recess is of a size to receive the key 28 of the glide block 18.

The provision of the interlocking key and recess serves to prevent the glide block from sliding backwards and forwards with the movement of the drawer. It also provides a definite location, to indicate, to the person charged with the assembly of the parts, where the glide block is to be positioned.

Referring to Fig. 6, the glide blocks 20 and 22 are fixed to the drawer slide 17 and a suitable recess is provided for the receipt of each glide block. Fig. 6 shows an enlarged portion of the slide 17 with a cutout 31 formed in the vertical wall 24 and in the upper shoulder 14 into which the glide block 22 can be received. The portion of the cutout 31 in the vertical wall 24 is to receive and accommodate the lower lateral portion 25 and the portion of the cutout in the upper shoulder 14 is to accommodate and receive the key 28. The block 20 is similarly fixed to lower shoulder 21. The outer surfaces of the lateral portions 25 and 26 are arcuate in form, as best shown in Fig. 7, and the outer surface of the transverse portion 28 of the glide block is similarly arcuate in form, as best shown in Fig. 8.

When the glide blocks are assembled with the slide and guide members, as shown in the drawings, it will be noted that the contact between said blocks and the metal surfaces is reduced to a line contact at the crown of the curved or arcuate portions, thereby reducing the contact area and reducing the friction between the parts. The line contact referred to is indicated by the broken lines 32 and 33 in Fig. 6.

It will be noted that when the glide blocks are assembled with the slide and guide components, the lateral portions straddle one of the horizontal portions of the slide or guide member with one of the lateral portions interposed between the member which the glide block straddles, and the adjacent horizontal portion of the other component. It will also be noted that the transverse portion 27 maintains the vertical portions of the two members out of contact with each other and provides bearing means in the event of lateral or side thrust on the drawers.

It will be noted that the lateral portions 25 and 26 are symmetrical in form, and, therefore, the glide blocks may be positioned without regard to which lateral portion is in the upper or lower position. This is particularly useful in the assembly of the elements because it does not require additional attention upon the part of the assembler to any specific orientation of the glide blocks. The fact that either of the lateral portions 25 or 26 may be in the upper or lower position is also useful for it permits the reversing of the glide blocks in the event that one bearing surface becomes worn. The outer surface of either glide block may be used as a bearing surface thereby prolonging the useful life of the glide block.

All three guide blocks used in each pair of slide and guide components may be of the same size and shape. Therefore, it is not necessary that the assembler position a particular glide block in any specific location, but any of the glide blocks may be located at any one of the three localities, with either of its lateral portions in the upper or lower position. It may be that in certain circumstances the gauge of the metal used in the guide 16 will be somewhat heavier than the gauge of the metal in the slides 17. In such case the space between the lateral portions 25 and 26 of the glide blocks 18 would be somewhat greater than the space between the lateral portions of the glide blocks 20 and 22. Therefore, to assist the assembler in determining the proper glide blocks to be assembled with the guide member 16, the glide blocks for the guide member may be tinted a color distinctive from the glide blocks to be located on the slide member 17 in the positions indicated by the glide blocks 20 and 22.

It has been found that the glide blocks may be formed of nylon or of a plastic material impregnated with nylon. The glide blocks may be molded from a nylon powder or other synthetic resin exhibiting suitable low frictional qualities, that is, providing a low coefficient of friction and having satisfactory wearing characteristics. Nylon has been found to be particularly useful because it has a self lubricating quality such that it provides a smooth slippery contact with metal parts. In the molding of the glide blocks, it has been found that by tinting the glide blocks to be used in the position of the glide block 18, as shown in the drawings, with suitable dyes or pigments, and molding the glide blocks for the positions 20 and 22 in a natural untinted shade, they can be readily distinguished during assembly. It will, of course, be understood that if the metal parts are all of the same gauge, there would be no need for distinguishing between the glide blocks for they would otherwise be interchangeable and could be positioned with either lateral portion in bearing position.

It will be understood that the space between the lateral portions of the glide blocks must be sufficient to fit the gauge of the metal, and it is desirable that the fit be of very close tolerance, that is, as nearly the same size as the metal gauge, plus any coating such as paint or enamel on the metal, so that there is a tight push fit between the glide blocks and the metal.

Referring to Figs. 1 and 4, the lower flange 19 of each of the guide members 16 is provided with a dip 35 in the flange. The lower flange 19 serves as the track for the slide members 17 and the dip 35 in the track is provided to hold the drawer in the closed position when the glide block 20 on the slide 17 moves into such dip, as shown in Fig. 1.

The upper flange 23 of the guide member 16 is formed at its front end, i. e., the end nearest the opening of the drawer recess, with an upwardly turned divergent portion 36 which provides an increasing distance between the upper and lower flanges 19 and 23 in the area adjacent the glide block 18.

With such an arrangement, the drawer may be removed readily from the cabinet by moving the drawer outward to the broken line position, shown in Fig. 1 and tilting the front end of the drawer upward so that the glide block 20 fixed to the slide member 17 may be lifted up and over the glide block 18 fixed to the guide. It has been found desirable to retain the flange 36 rather than discontinue the flange at the point of transition from the upper flange 23 to the upwardly angled flange 36 so that the guide member retains its channel shape, and is, therefore, not weakened by the removal of the flange.

It will be noted that the guide 16 is provided at its front end with a punched out lug 37 and a screw hole 38 and a lug 40 at its rear end, see Fig. 4. These are provided for attachment of the guide 16 to the frame of the cabinet or desk in which the guide is to be used as a drawer suspension means. Suitable slots such as those shown at 41 in Fig. 3 are provided for receiving the lugs 40. The slots 42 in the front columns 12, best shown in Fig. 2, are adapted to receive the lugs 37. The screw holes 43 are also provided in the columns 12 to receive screws 44. The slide members 17 are provided with flanges 45 which may be fixed to the sides of the drawer 15 by suitable means such as spot welding. The means of connection of the guide and the slide members may be accomplished in any other suitable manner.

It will be appreciated from the foregoing that by the positioning of the glide blocks 18, 20 and 22 in the locations shown in the figures, a drawer may be supported throughout its travel from an outer position to the closed position by all three of the glide blocks. It will also be noted that the drawer may be readily removed in the manner indicated above.

From the foregoing description, it will be appreciated that the invention achieves the objects of providing a load-supporting bearing element between the slide and guide components of the drawer suspension which may be assembled readily with the guide and slide members, and which may be retained in position without providing additional or auxiliary connecting means. In this regard, it may be noted that the glide blocks are held against sliding with the drawer by the keys 28 engaging in the recesses 30 and 31, and are held against displacement in a direction transverse to the sliding of the drawer by the push fit of the slide blocks themselves and by the abutment of the vertical portions of the slide and guide members with the transverse portions 27 of the glide blocks.

It will also be appreciated that the invention achieves the object of providing bearing elements which have low frictional characteristics and which function as load-bearing elements and also act to give lateral bearing between the interacting metal surfaces of the slide and the guide components of the drawer suspension. Each of the glide blocks act as bearing elements between the vertical and horizontal portions of the guide and slide members.

The invention also achieves the object and provides the advantage in assembly of using bearing elements which are reversible and at least some of which are interchangeable. As noted, the reversible feature of the glide blocks is useful in prolonging the useful life of such elements.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A drawer suspension means, comprising guide and slide components with interfitting horizontal and vertical surfaces, a load-supporting bearing element for maintaining the interfitting components of the drawer slide and guide therefor spaced apart out of frictional engagement, the bearing element including a glide block made of material having a low coefficient of friction, and being formed into two lateral portions connected by a transverse portion at one end of said lateral portions and having a central key between them, said key being centrally disposed between said lateral portions, said lateral portions being adapted to straddle one of the horizontal portions of the drawer slide and guide components and the key portion being receivable in U-shaped cutouts formed in the horizontal portions of the drawer slide and guide components for maintaining the block in fixed position with one of the lateral portions interposed between the horizontal portion of the component which it straddles and the adjacent horizontal portion of the other component and the transverse portion serving for maintaining the edge of the horizontal portion to which the block is attached out of engagement with the adjacent vertical portion of the other component.

2. In a slide suspension for a drawer including guide members fixed in a drawer recess and slide members mounted on the sides of a drawer interfitting with the guide members, wherein each guide member defines a channel having an upper and lower flange separated by a vertical wall, and each slide member has upper and lower shoulders separated by a vertical portion, a first glide block fixed to the lower flange of each guide member adjacent the front of the drawer recess in load-supporting bearing contact with the lower shoulder of the corresponding slide member, a second glide block fixed to the lower shoulder of each slide member, at a location spaced from the front of the drawer, in load-supporting bearing contact with the lower flange of the corresponding guide member, a third glide block fixed to the upper shoulder of the slide member adjacent the rear of the drawer, in bearing contact with the upper flange of the corresponding guide member, said glide blocks being made of material having low frictional characteristics and formed with two lateral portions connected by a transverse portion at one end of said lateral portions and having a central key, said key being centrally disposed between the lateral portions, a recess formed in the lower flange of each guide member for receiving the key of the first glide block, the lateral portions of said glide block straddling the said lower flange, a cutout formed in the vertical portion and the lower shoulder of each slide member for receiving one lateral portion and the key of the second glide block, and another cutout formed in the vertical portion and the upper shoulder of each slide member for receiving one lateral portion and the key of the third glide block.

3. A drawer suspension having a slide member and a guide member therefor wherein each of said members has at least one horizontal portion adjacent the other and each member has a vertical portion opposite the edge of the horizontal portion of the other member, a glide block bearing element having lateral portions and a connecting transverse portion adjacent one end of the lateral portions, said lateral portions being spaced apart to define a member receiving slot and being adapted to straddle the horizontal portion of one of said members, the member being received in the slot, with one of the lateral portions interposed between and spacing apart such horizontal portion and the adjacent horizontal portion of the other member and with the transverse portion interposed between and spacing apart the edge of such horizontal portion and the vertical portion of the other member opposite such edge.

References Cited in the file of this patent

UNITED STATES PATENTS

| | | |
|---|---|---|
| 1,172,711 | Hunter | Feb. 22, 1916 |
| 2,514,664 | Miller et al. | July 11, 1950 |
| 2,606,091 | Buchy et al. | Aug. 5, 1952 |